Feb. 1, 1966  S. N. PEREZ  3,232,249
SWING TABLE
Filed March 4, 1964
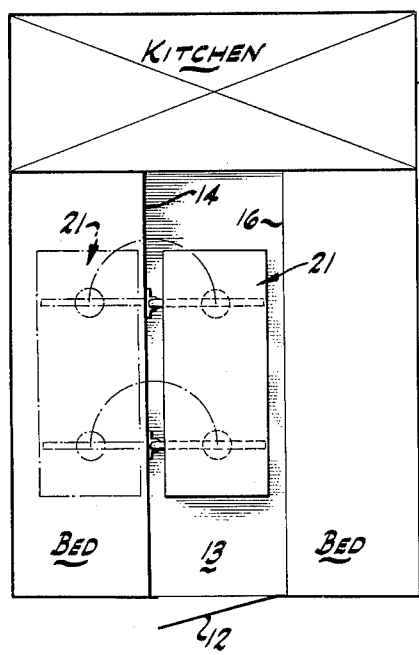
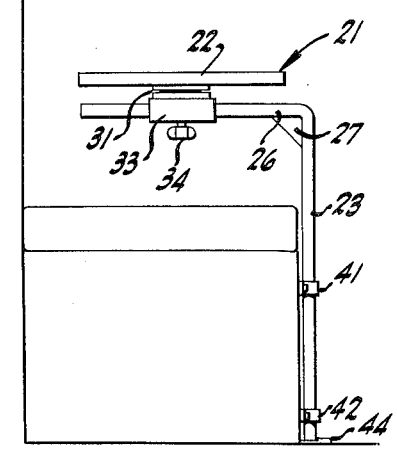
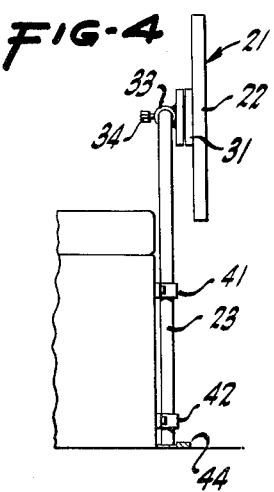
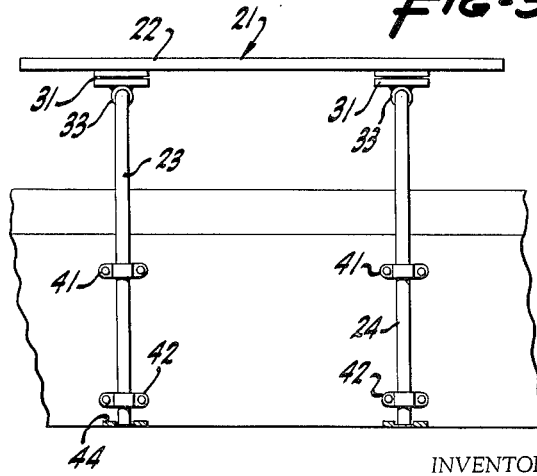
INVENTOR.
SALVADOR N. PEREZ
BY
Lippincott, Ralle & Hendrickson
ATTORNEYS

United States Patent Office 3,232,249
Patented Feb. 1, 1966

3,232,249
SWING TABLE
Salvador N. Perez, 1624 E. Carson St., Torrance, Calif.
Filed Mar. 4, 1964, Ser. No. 349,333
5 Claims. (Cl. 108—42)

The present invention is directed to a movable table, particularly adapted for utilization in confined spaces, such as trailers or campers, and which swings and rotates between usable and storage positions, as well as being entirely removable for storage in some other location.

Although the present invention is not necessarily limited to utilization in a camper or trailer, it is particularly adapted thereto, because of the minimum amount of physical space which is provided in many house trailers and in all campers adapted to fit upon the back of a small truck or pickup. It is here noted that a camper is a closed living compartment of limited size fitting upon the bed of a light truck or pickup. In the design and construction of campers and house trailers of limited size, it is conventional to locate the kitchen area adjacent the rear thereof, in order that an open aisle may be provided to the sleeping and eating area. It is, of course, possible in side entry trailers to vary this relative location of elements; however, in rear opening trailers and necessarily in campers wherein the door must be located at the rear thereof, it has been found that the provision of two beds on opposite sides of the unit extending longitudinally thereof, and thus doubly suited for sleeping and seating, must be positioned at the forward end of the unit in order that a table disposed therebetween will not block the aisle between the beds so that access to the kitchen is available. Unfortunately, this relative physical location of elements is undesirable, inasmuch as it places the maximum weight of the unit at the rear thereof. It will be readily recognized that this is an undesirable situation as regards trailers which must be towed by a hitch on an automobile, or the like, at the forward end of the trailer and, additionally, it is undesirable in campers fitting upon the back of a pickup, inasmuch as it tends to overload the rear of the pickup rather than place the maximum weight adjacent the center of gravity of the pickup.

The present invention is particularly directed to a swing table which is removably mounted on the aisle-side of one twin bed of a camper or trailer, and is movable from a position over one of the beds to a position between the beds, and is also rotatable into a vertical plane alongside one of the beds. It will be seen that in this manner the table may be made readily usable for eating, or the like, by persons seated upon either or both of the beds, may be employed as a counter while disposed above one of the beds, and yet entirely out of blocking relationship to the aisle between the beds, and furthermore, may be positioned almost entirely out of the way by rotation into a vertical plane adjacent one of the beds. This capability of the table hereof thus makes it possible to redesign the physical location of elements in a camper or trailer of limited internal volume. With this table it then becomes practical to locate twin beds longitudinally of the unit on either side of a rear entry door to define an open aisle to the front of the unit whereat kitchen facilities are located. Consequently, the weight of stoves, refrigerators, and the like, normally provided in campers or trailers, may be disposed at the forward end of the unit, and thus attain the desirable weight location discussed above. It is noted at this point that the terms "camper" and "trailer" are hereinafter employed interchangeably, inasmuch as they may be substantially identical insofar as the advantages of the present invention are concerned.

It is an object of the present invention to provide an improved table of rigid structure and movable position adapted for removable attachment to a seating unit, or the like, and having a multiplicity of degrees of motion for maximum utility of the table, particularly in confined spaces.

It is a further object of the present invention to provide a swing table having a rigid table top pivotally mounted upon L-shaped standards that are in turn adapted for removable engagement in rotatable relation to a bench, or the like, and wherein the table top is additionally rotatably secured to the standards so that in a predetermined rotational position of the latter, the table top may be moved from a horizontal to a vertical plane.

Various other possible objects of the present invention will become apparent to those skilled in the art from the following description of a single preferred embodiment of this invention; however, no limitations are intended by the terms of the following description, and instead, reference is made to the appended claims for a precise delineation of the true scope of this invention.

The present invention is illustrated as to a single preferred embodiment thereof in the accompanying drawings, wherein:

FIGURE 1 is a schematic plan view of a twin-bed camper with the top removed, and showing the swing table in two possible positions therein;

FIGURE 2 is an end view in elevation of the swing table of this invention;

FIGURE 3 is a side elevational view of the table of this invention; and

FIGURE 4 is an end elevational view of the swing table rotated into vertical storage position.

Considering the present invention in greater detail, reference is made to FIGURE 1 of the drawings, illustrating a preferred location and utilization of the invention hereof. There is schematically illustrated a camper 11 similar in general configuration to a small house trailer, and adapted to fit into the bed of a light truck or pickup, although it will be realized that the illustration applies equally to a small trailer. A door 12 at the back of the camper opens to a central aisle 13 longitudinally of the unit, and twin beds 14 and 16 are disposed one on each side of this aisle. The forward portion of the camper unit 11 may comprise a kitchen including, for example, a suitable butane stove, sink and drainboard, refrigerator and storage area. In order to utilize this configuration of trailers or campers described above, it is necessary for the aisle 13 to be open from the entry door 12 to the kitchen and storage area; however, it is also necesary to provide some type of table which may be used in conjunction with the beds 14 and 16 serving as benches. These requirements are mutually incompatible to the extent that placement of a table in the aisle 13 prevents utilization of this space as an aisle to move from the front to the rear of the unit. The present invention provides an improved swing table 21, illustrated in solid lines as being disposed between the beds 14 and 16 for utilization as a table in conjunction therewith. There is also illustrated in dotted lines an alternative position of the table, and to which it is capable of being swung, and such position will be seen to be overlying one of the beds 14, so as to be available for use as a counter, or the like, while substantially entirely out of the volume of the passage aisle 13. In addition, table 21 is rotatable from a horizontal plane, as illustrated in FIGURE 1, and to a vertical plane, as illustrated in FIGURE 4, and described in more detail below. This table structure thus provides all of the advantages of a fixed pedestal table between the beds when they are employed as benches or couches, and also provides a swing-away counter space, as well as being rotatable into a storage position. In addition, the table is entirely removable from its mounting, so that it is possible to store the table in some other place if desired, in order to leave the bed or seating area entirely free of obstruction. It will thus be seen that the improved swing table of the present invention enables the design and construction of an entirely different camper or trailer layout in which the heavy kitchen units included therein may be advantageously positioned at the forward extremity of the area for preferable loading of the unit carrying or hauling the camper or trailer.

Considering now the structural details of the table itself, reference is made to FIGURES 2 and 3, wherein the table of this invention is illustrated in end and side view. The illustrated embodiment of the table includes a rigid planar top 22, supported by a pair of L-shaped standards 23 and 24. The standards are identical and the one illustrated in FIGURE 2 will be seen to include a horizontal arm 26 extending perpendicularly from the top of the upright portion and rigidly affixed thereto. A web or gusset 27 may be welded betwen the vertical and horizontal portions of the standard to strengthen the corner. Preferably, the standard 23 is formed of a lightweight small-diameter pipe or bar of adequate structural rigidity to support weights normally applied to the table top 22, and having a round cross-section. Attachment of the table top 22 to the horizontal standard portion 26 is accomplished by means of a pivot unit 31, which may be quite conventional in structure. The pivot unit 31 may, for example, have upper and lower plates connected together by a central pin, so that they may turn relative to each other in parallel planes, and ball bearings may be provided between the plates so that they ride easily upon each other. One of the plates of the pivot unit 31 is firmly secured to the underside of the table top 22, and the lower plate of the pivot unit has a short, hollow cylinder 33 secured, as by welding, to the underside thereof. This cylinder is thus disposed parallel to the table top beneath same. This cylinder 33 has an internal diameter substantially equal to the external diameter of the standard portion 26, and this horizontal standard portion extends through the cylinder in rotatable relation thereto. Means are provided for locking together the cylinder and standard to prevent rotation, and this means may comprise a thumb screw 34 threaded through the bottom of the cylinder to clamp against the standard.

The standards 23 and 24 supporting the table top are, themselves, mounted for rotation and are disposed in spaced parallel relationship a distance apart which is greater than the length of the horizontal extensions of these standards. Suitable mounting of the standards may be accomplished by provision of mounting straps 41 and 42 in the standard 23, and like straps in the standard 24. In the distance wherein the mounting straps for the standards 23 and 24 are to be affixed to a solid vertical base of a camper bed, or the like, as illustrated, they need only comprise metal strips extending over and about the standard and secured as by screws to the lower bed portion. The mounting means are affixed sufficiently loosely that the standards may be rotated therein. Although it is not normally necessary, it is possible to provide bottom bearing surfaces for the standards. In practice it has been found that the standards may normally be disposed directly upon a floor of the camper or trailer unit, however, there is illustrated in FIGURE 3 a bearing plate 44 at the base of each of the standards and supporting the bottom end of the standard in rotatable relation thereto.

Considering now operation of the swing table of the present invention, it may first be noted from FIGURE 2, for example, that the standards 23 and 24 serve to support the table top 22 in one position directly above a bed unit 14. With the standard extension 26 directed outwardly of the camper, it will be disposed over the top of the bed or bench, and consequently, the table top carried thereby will likewise be so disposed. In this position, as illustrated by dotted lines in FIGURE 1, the table will be seen to be substantially entirely out of blocking relation to the central aisle 13 of the camper. Movement of the table into position for use as a table between the beds or benches in the aisle 13 is simply accomplished by grasping the table top and swinging it through an arc in a horizontal plane, whereby the standards 23 and 24 rotate in their mounting means, and the table top pivots upon the pivot units 31. Rotation of the standards to swing the horizontal extension 26 of standard 23, for example, through a 180° arc will serve to place the table in the position shown in solid lines in FIGURE 1, i.e., between the bed or bench units 14 and 16. In this position, the table is fully usable as a table for dining or other activities, and is readily available to persons sitting upon either during this movement, but instead, swings upon spaced pivots.

An additional degree of motion provided for the swing table of this invention allows rotation of the table top into a vertical plane along side of the bed or bench 14. This movement is accomplished by grasping the table top and moving it in an arc through 90° from either of the positions illustrated in FIGURE 1. In this position, the horizontal extensions of the standards are disposed in alignment along the edge of the bed 14. In this position, the locking means, such as set screws 34, are loosened so that the hollow cylinder 33 may be rotated upon the horizontal extensions of the standards. Rotation of the table top is then possible to swing it from a horizontal position to a vertical position, inasmuch as the mounting means are all in alignment. This movement does not require motion of the pivot unit 31, which is actually provided in order to accommodate the movement of the table top in a horizontal plane, rather than from a horizontal to a vertical plane. It is, of course, also possible to secure the table top in any degree of inclination between horizontal and vertical, if such should appear desirable, and it is only necessary to rotate the table top to the desired inclination and then to tighten the locking means 34 so that further rotation of the cylinder upon the standard is prevented.

In the vertical disposition of the table top, as illustrated in FIGURE 4, it will be seen that the entire unit occupies a bare minimum of physical space within the camper or trailer. It is consequently substantially entirely out of the way, insofar as the central aisle of the camper trailer is concerned. Normally, the table top will remain in this vertical position, inasmuch as the connection of the table top by the pivot means is at least slightly off-center, so that a majority of the table top weight will be disposed below the mounting cylinder 33 when the table top is in vertical position. If an alternative mounting position is employed, or it is desired to insure that the table top does not vibrate, or the like, it is possible to tighten the locking means 34 with the table top in vertical position and, consequently, firmly secure it there.

Although the vertical storage position of the table top places the table substantially entirely out of the aisle 13, it will be realized that under certain circumstances it may be desirable to entirely remove the table from its normal position. This may be quite readily accomplished by merely grasping the table top and lifting it, which then serves to draw the standards 23 and 24 vertically upwardly from the mounting straps, or mounting means, rotatably securing same to the bed foundation. This removal may be desirable to provide more ready access to the bed 14, for example, particularly at night. The weight of the table normally maintains it in proper position, as illustrated in the drawings; however, the entire table including top and standards, is quite light, and consequently may be readily raised and thus removed from its normal mounted position. When removed, the entire swing table may be stored in some alternative position, such as in the kitchen area of a camper trailer. However, it is to be particularly noted that physical removal of the table from the normal mounted position thereof is not necessary in most instances. A primary advantage of the table hereof is thus identified in that same is at all times readily usable and may be swung into counter position or normal table position with a minimum of effort, and yet may also be positioned entirely out of the way for full utilization of the aisle within which it is disposed as a table.

There has been described above, a single preferred embodiment of the present invention, which will be seen to completely fulfill the objects of the invention as also set forth above, and to provide numerous advantages, particularly when utilized in cramped quarters or areas of limited space and multiple usage. It is by no means intended by the foregoing description to limit the application of the invention hereof to trailers or campers, for certainly it is equally applicable in a variety of other surroundings, such as boats, apartments, shops, and the like. The invention described above may thus be employed in a variety of different circumstances, and may also be varied in structure within certain limits, so that attention is invited to the following claims for an exact definition of the scope of the invention.

What is claimed is:

1. A swing table comprising a rigid table top, at least one table leg having a vertical portion and a horizontal extension from the top thereof, said leg being adapted for rotatable mounting at the vertical leg portion to swing the horizontal extension through an arc, pivot means secured to the bottom of said table top, mounting means secured to said pivot means and rotatably engaging the horizontal extension of said leg, whereby said top is swingable through an arc in a horizontal plane and is rotatable about said horizontal extension into a vertical position, and locking means controllably securing said mounting means and horizontal extension against relative rotation to fix the vertical inclination of the table top.

2. A swing table comprising a rigid table top, a pivot mount secured to the underside of said table top, a hollow cylinder fixed to said pivot mount for pivoting relative to the table top in a plane parallel thereto, an L-shaped standard disposed with one leg extending rotatably through said cylinder substantially parallel to said table top and the other leg depending from the table top for rotatable mounting in vertical disposition supporting the table top, whereby said top is movable in an arc in a horizontal plane with rotation of the vertical leg of said standard and is rotatable between vertical and horizontal planes with cylinder rotation on said standards.

3. A swing table comprising a rigid table top adapted for normal disposition in a horizontal plane, a pair of parallel L-shaped standards disposed beneath said table top with one horizontal leg of each extending along and parallel to the underside of the table top and the other leg of each standard depending vertically for rotatable mounting to swing the horizontal legs in like arcs in a horizontal plane, a pair of hollow cylinders rotatably disposed one about each of said horizontal legs, and means pivotally mounting the cylinders onto the underside of said table top whereby said top is movable through an arc in a horizontal plane and is rotatable into a vertical plane when said horizontal legs are aligned.

4. In a trailer or camper having a central rear door with twin beds defining a longitudinal aisle therebetween from the door to a forward area, the improvement comprising a pair of substantially L-shaped standards, mounting means upon an aisle side of one bed and removably mounting a vertical leg of each standard in rotatable relation to the bed with the vertical legs being separated a distance at least equal to the length of the other legs of the standards, a rigid table top, means mounting said table top upon the horizontal legs of said standards at points separated a distance equal to the spacing between vertical legs of the standards, said mounting means rotatably engaging said horizontal legs and each including a pivot connection whereby said table top is movable in an arc with rotation of the standards between a position over the aisle to a position over a bed and is also rotatable between a horizontal and a vertical plane when the horizontal legs are aligned.

5. The combination set forth in claim 4, further characterized by locking means upon each of the means mounting the table top on the standards and controllably fixing the top against rotational movement about the horizontal legs of the standards.

References Cited by the Examiner
UNITED STATES PATENTS

| | | | |
|---|---|---|---|
| 434,559 | 8/1890 | Fish | 108—43 |
| 480,386 | 8/1892 | Hutton | 108—42 |
| 577,145 | 2/1897 | McKeag | 108—8 |
| 964,078 | 7/1910 | Winans | 297—142 |
| 1,211,527 | 1/1917 | Berndt | 108—8 |
| 2,067,661 | 1/1937 | Ferrelle | 108—52 X |

FRANK B. SHERRY, *Primary Examiner.*

UNITED STATES PATENT OFFICE
CERTIFICATE OF CORRECTION

Patent No. 3,232,249                  February 1, 1966

Salvador N. Perez

It is hereby certified that error appears in the above numbered patent requiring correction and that the said Letters Patent should read as corrected below.

Column 4, line 14, after "either" insert -- of the bed or bench units. The table top does not rotate --.

Signed and sealed this 3rd day of January 1967.

(SEAL)

Attest:

ERNEST W. SWIDER                  EDWARD J. BRENNER

Attesting Officer                    Commissioner of Patents